US011926070B2

(12) United States Patent
Burmester et al.

(10) Patent No.: US 11,926,070 B2
(45) Date of Patent: Mar. 12, 2024

(54) TARGETED OIL DELIVERY FOR CHAIN SAW BARS

(71) Applicant: Oregon Tool, Inc., Portland, OR (US)

(72) Inventors: Eric M. Burmester, Happy Valley, OR (US); Michael D. Harfst, Milwaukie, OR (US); Sam Hutsell, Portland, OR (US); Genesis McDermott, Redmond, WA (US); Patrick Sellars, Oregon City, OR (US); James Matthew Cunnington, Tualatin, OR (US); Jonah Smith Sedaghaty, Camas, WA (US)

(73) Assignee: Oregon Tool, Inc., Portland, OR (US)

( * ) Notice: Subject to any disclaimer, the term of this patent is extended or adjusted under 35 U.S.C. 154(b) by 78 days.

(21) Appl. No.: 17/524,543

(22) Filed: Nov. 11, 2021

(65) Prior Publication Data

US 2022/0143860 A1 May 12, 2022

Related U.S. Application Data

(60) Provisional application No. 63/113,098, filed on Nov. 12, 2020.

(51) Int. Cl.
*B27B 17/12* (2006.01)
*B27B 17/02* (2006.01)

(52) U.S. Cl.
CPC .............. *B27B 17/12* (2013.01); *B27B 17/02* (2013.01); *B27B 17/025* (2013.01); *Y10T 83/263* (2015.04)

(58) Field of Classification Search
CPC ....... B27B 17/02; B27B 17/12; B27B 17/025; Y10T 83/263
USPC .......................................................... 30/123.4
See application file for complete search history.

(56) References Cited

U.S. PATENT DOCUMENTS

| | | | | |
|---|---|---|---|---|
| 4,393,590 A * | 7/1983 | Pantzar | B27B 17/12 | 30/387 |
| 4,486,953 A * | 12/1984 | Halverson | B27B 17/02 | 30/387 |
| 4,819,332 A | 4/1989 | Sugihara et al. | | |
| 4,947,550 A * | 8/1990 | Wenzel | B27B 17/12 | 30/387 |
| 5,035,058 A | 7/1991 | Date et al. | | |

(Continued)

FOREIGN PATENT DOCUMENTS

| | | | |
|---|---|---|---|
| DE | 20315680 U1 * | 2/2004 | B27B 17/02 |
| JP | H09314503 A | 12/1997 | |

OTHER PUBLICATIONS

DE-20315680-U1 English Translation; Feb. 2004; Steinert Wolfgang.*

(Continued)

*Primary Examiner* — Laura M Lee
(74) *Attorney, Agent, or Firm* — Foley & Lardner LLP

(57) ABSTRACT

Embodiments include a bar for a chain saw that is equipped with one or more oil channels that run along the length of the bar. Each oil channel receives oil at a first end, which exits the oil channel at an oil exit aperture at a second end of the channel. The oil exit aperture of one of the channels is positioned along the side of a bar groove, through which runs the saw chain, proximate to the cutting area of the bar to lubricate the saw chain just prior to the cutting area. A second channel may have an oil exit aperture proximate to the nose of the bar, to lubricate a sprocket wheel in the nose of the bar.

19 Claims, 8 Drawing Sheets

(56) References Cited

U.S. PATENT DOCUMENTS

| | | | | | |
|---|---|---|---|---|---|
| 5,056,224 | A * | 10/1991 | Seigneur | B27B 17/12 | 144/34.1 |
| 5,711,901 | A * | 1/1998 | Berg | F02M 7/087 | 261/34.3 |
| 5,803,035 | A * | 9/1998 | Guntly | F02M 1/16 | 261/DIG. 8 |
| 6,219,921 | B1 * | 4/2001 | Pettersson | B27B 17/02 | 30/383 |
| 6,397,475 | B1 * | 6/2002 | Pettersson | A01G 23/091 | 30/383 |
| 6,619,171 | B2 * | 9/2003 | Wade | B27B 17/02 | 144/34.1 |
| 6,643,933 | B2 * | 11/2003 | Seigneur | B27B 17/025 | 144/34.6 |
| 10,040,214 | B2 * | 8/2018 | Baratta | B27B 17/025 | |
| 10,086,528 | B2 * | 10/2018 | Baratta | B27B 17/02 | |
| 2016/0257026 | A1 * | 9/2016 | Lux | B27B 17/02 | |
| 2018/0304489 | A1 | 10/2018 | Cornett et al. | | |
| 2022/0143860 | A1 * | 5/2022 | Burmester | B27B 17/025 | |

OTHER PUBLICATIONS

International Search Report and Written Opinion dated Feb. 24, 2022 for International Application No. PCT/US2021/059017, 11 pages.

* cited by examiner

TARGETED OIL DELIVERY FOR CHAIN SAW BARS

CROSS-REFERENCE TO RELATED APPLICATIONS

This application claims priority to U.S. Provisional Application No. 63/113,098, filed on 12 Nov. 2020, the contents of which are incorporated by this reference as if stated fully herein.

TECHNICAL FIELD

The present disclosure relates to the field of powered tools such as chain saws, and specifically to systems and methods for targeted oil delivery to chain saw bars.

BACKGROUND

Chain saws typically consist of a power unit, which drives a sprocket. The sprocket in turn drives a chain that is fitted with a plurality of cutting teeth. The chain runs around the outer perimeter of an elongated but relatively flat bar, typically equipped with a second sprocket in its nose, distal from the power unit. The bar and the chain form the cutting assembly that is applied to a work piece to make a cut. The chain typically moves at high speed around the perimeter of the bar and is subject to significant pressure during cutting, which can result in significant friction and rapid component failure in the absence of lubrication. Most chain saws thus provide lubrication in the form of bar oil or another suitable lubricant, which is supplied from the power unit. As the bar oil is applied to the moving chain, which in turn is applied to the work piece, bar oil is continuously lost as the chain saw is used, requiring the bar oil to be periodically replenished.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 5A-5H2 are a series of cross-sectional views of oil outlets for a solid bar, such as one of the arrangements of FIGS. 4A-4E, according to various embodiments.

DETAILED DESCRIPTION OF DISCLOSED EMBODIMENTS

Figure 1:
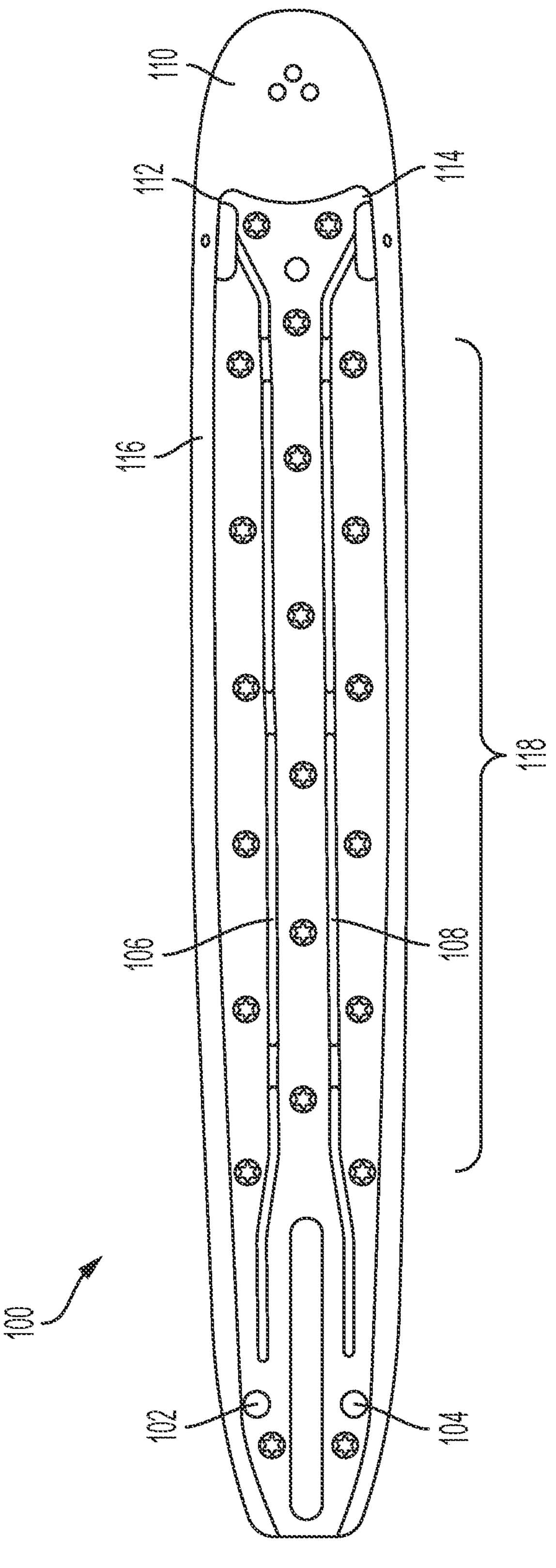
FIG. 1 is a cross-section of an example chain saw bar, illustrating internal oil channels for targeted oil delivery, according to various embodiments.

In the following detailed description, reference is made to the accompanying figures which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms “coupled” and “connected,” along with their derivatives, may be used. It should be understood that these terms are not intended as synonyms for each other. Rather, in particular embodiments, “connected” may be used to indicate that two or more elements are in direct physical contact with each other. “Coupled” may mean that two or more elements are in direct physical contact. However, “coupled” may also mean that two or more elements are not in direct contact with each other, but yet still cooperate or interact with each other.

For the purposes of the description, a phrase in the form “A/B” or in the form “A and/or B” means (A), (B), or (A and B). For the purposes of the description, a phrase in the form “at least one of A, B, and C” means (A), (B), (C), (A and B), (A and C), (B and C), or (A, B and C). For the purposes of the description, a phrase in the form “(A)B” means (B) or (AB) that is, A is an optional element.

The description may use the terms “embodiment” or “embodiments,” which may each refer to one or more of the same or different embodiments. Furthermore, the terms “comprising,” “including,” “having,” and the like, as used with respect to embodiments, are synonymous.

In a typical chain saw, the bar is lubricated/oiled from the power head of the saw, either from a tank on the power head or located remote from the power head, and delivered via a conduit. The lubrication is typically a petroleum-based bar oil of relatively high viscosity or, in some applications, a grease. The lubrication mechanism typically pumps oil constantly into one or more oil holes on the rear of the chain saw bar, where the bar attaches into the saw power head, which floods a groove or channel that runs around the perimeter of the bar with oil. For both safety and operability reasons, the chain on most chain saws exits the power head at the top of the bar, travels around the nose of the bar, usually guided by a sprocket in the bar nose, and returns to the power head traveling along the bottom of the bar. The groove is located immediately under, and is covered by, the chain as it travels around the bar perimeter, so that the chain picks up the oil and carries it around the nose to the bottom of the bar, where the primary cutting area is located. Thus, to ensure sufficient lubrication of the entire bar and nose sprocket, the oil hole or holes in existing chain saw bars are in fluid communication with the start of the groove at the top of the bar, where the chain exits the power head, so that the chain theoretically carries the oil to the entire bar. Lubrication across the bar perimeter helps keep temperatures across the bar during operation to an acceptably low level, which also helps to minimize bar wear. Generally speaking, higher temperatures of a given section or component correlate with greater potential wear. High temperatures can be symptomatic of deficient lubrication and commensurate increased friction, which in turn may result in accelerated wear.

At the cutting area at the bottom of the bar, both the bar and the chain can experience high pressures and friction while the saw is cutting, as the chain is pressed into the bottom of the bar by downward pressure to cut the work piece. Proper lubrication to this area, which is farthest from the power head in terms of chain travel distance and so is farthest from the point at which bar oil is supplied to the chain and bar, is critical to maximize the life of the chain and the bar. Without proper lubrication, temperatures in the cutting area can climb to levels that would result in rapid wear of both the bar and the saw chain. To ensure proper lubrication to the chain, all parts of the bar, the sprocket in the nose of the bar, and in particular to the cutting area, a relatively large amount of oil must be provided to the oil hole(s), with the chain and its motion over the groove relied upon to distribute the oil to all parts where needed. Depending upon the type of saw, e.g. hand-held chain saw or commercial harvester with a remotely powered/operated saw head, this lubrication may be provided continuously as the saw is operated, or at discrete or intermittent intervals, such as at the start of each cutting cycle. Other types of machinery, including machinery other than saws, may provide necessary lubrication on a continuous or intermittent schedule, depending upon the particular needs of a given machine.

This approach of flooding the bar groove with oil, while effective to keep the chain and bar lubricated, is potentially wasteful and potentially damaging to the environment. As the chain moves around the bar, oil is flung from the nose of the bar prior to reaching the cutting area due to centrifugal force from the chain making a U-shaped curve as well as the spinning of the sprocket in the nose, despite the use of a relatively high viscosity bar oil. This flinging effect can be exacerbated somewhat by the greater volume of oil required to ensure that sufficient oil remains for the bottom of the bar, which itself necessitates a greater volume of oil to compensate for the flinging effect. Oil is further lost as the chain and bottom of the bar come into contact with a work piece, and oil is transferred to the work piece being cut. In some instances, the lubrication mechanism may vary in speed proportional to the saw's speed to avoid over-lubricating while the chain saw is at low speeds, thereby reducing loss while the chain saw is idling. However, a variable speed oiling mechanism does not significantly reduce oil loss while the chain saw is at operating speed or in the process of cutting. The consumption of oil by known chain offing systems can become a significant expense for an operator who makes extensive use of chain saws, and may further create unnecessary environmental pollution.

To improve oil consumption efficiency, disclosed embodiments include a bar with a construction that allows for the creation of enclosed oil channels within the body of the bar that are in communication with various points on the bar. By suppling oil into the oil channels at points other than at the start of the chain travel, oil can be directly supplied to specific locations on the bar, and potentially at multiple points relatively simultaneously, such as the nose sprocket, cutting area, areas identified as typically having the highest temperatures during chain saw operation, and/or any other area identified as being subject to increase temperatures and/or pressures. Because the oil channels allow oil to be directly supplied to the nose sprocket and cutting area, the amount of oil introduced at the start of the chain travel can be significantly reduced as it is not necessary to rely upon the chain to carry sufficient oil around the entire bar perimeter. As a result, a lesser quantity of oil can be more evenly distributed over the entire travel path of the chain around the bar or targeted for delivery proximate to areas of high potential wear, such as the nose sprocket and/or cutting area. Thus, losses from the nose of the bar from too much oil can be reduced or possibly avoided.

Embodiments herein provide a reduction in overall oil consumption by a chain saw system of 20-60%, such as 30-50%. In one particular example, a chain saw with a bar configured for targeted oil delivery, such as one of the embodiment bars disclosed herein, achieved a reduction in lubrication use by approximately 30-35%, while maintaining wear amounts comparable to a conventionally oiled bar (e.g. single point at the start of the saw chain's travel around the bar). In addition to providing a reduction in overall oil consumption, embodiments herein provide a decrease in bar rail wear up to 75-85%, and a decrease in saw chain stretch (a form of wear, such as may be caused by frictional wear between saw chain links) up to 15-25%. These reductions are achieved at flow rates that are approximately 25% of those used for a conventionally oiled bar. Accordingly, disclosed embodiments allow flow rates to be reduced, e.g. by 20-60%, while still achieving wear amounts comparable to those seen in a conventionally oiled bar, thus preserving the normally expected life of the bar and saw chain while realizing a substantial savings in oil consumption. Alternatively, disclosed embodiments can be used with oiling systems that deliver oil at a conventional bar rate to achieve significantly lower amounts of wear, thus potentially prolonging the life of the bar and saw chain. Still further, in some embodiments a compromise point can be realized, viz. a more modest reduction in oil consumption coupled with a modest increase in bar and saw chain life. These parameters can be tuned as necessary to maximize cost savings, weighing the cost of bar oil, replacement bars, and saw chains against each other.

Further, in some embodiments the oil channels can be fitted with one or more valves that are temperature sensitive. The oil needs of the bar can increase as the bar heats up from use. Temperature sensitive valves within the bar allow oil delivery to be kept low while the bar is cold, but can open to gradually increase oil flow as the bar heats up. The use of temperature sensitive valves on multiple channels can allow oil flow to selectively increase as various parts of the bar heat up at a greater rate than others. The use of valves also may help conserve oil while the chain saw is not in use, as the valves can close in response to the temperature of the bar dropping, thereby retaining oil within the channels and preventing oil drainage through the chain due to gravity or latent pressure while the saw is not in use. Still further, depending upon the valve configuration, some passageways through the bar can be selectively opened or shut, allowing the bar to be removed and flipped over (e.g. top rail becomes the bottom rail with the cutting area) to help equalize wear. The valves can control the delivery of oil to needed locations regardless of bar orientation. For example, using a sliding valve that repositions based on gravity, oil passageways can open or shut to ensure lubrication flows primarily to the cutting area and top of the nose sprocket regardless of which side of the bar is positioned as the cutting area.

While this disclosure describes embodiments in the context of lubrication, and specifically for the transport of bar or chain oil, it should be understood that the disclosed embodiments could be employed with the transport of a variety of different types of fluids, including fluids other than oils. Examples of other types of fluids may include coolants and cooling fluids, abrasive or abrasive-carrying fluids, fuels, water, synthetic fluids, synthetic or hybrid lubricants, solvents, cleaning fluids, or any other fluid that may be useful to transfer along a structure similar to a chain saw bar. The reader should understand that any of the foregoing fluids may be substituted for oil when oil is discussed herein.

FIG. 1 illustrates the internal structures of a chain saw bar 100 according to one possible embodiment. Bar 100 includes a first oil (or fluid) hole 102 and a second oil (or fluid) hole 104. The first oil hole 102 is in fluid communication with a first oil (or fluid) channel 106, and the second oil hole 104 is in fluid communication with a second oil (or fluid) channel 108. A sprocket may mount in the nose 110 of the bar 100. Around the perimeter of bar 100 runs a bar groove 116, through which a portion of a saw chain may run. The top of the bar groove 116 can form two parallel rails, upon which the saw chain slides. In a typical implementation, the bar 100 is mounted to a saw powerhead (not illustrated) which includes a mechanism for providing oil or another suitable fluid to the first oil hole 102 and/or second oil hole 104. The mechanism may be a pump and/or reservoir, or another suitable mechanism for fluid delivery as may be known in the art and appropriate to a given implementation.

As mentioned above, nose 110 typically includes a sprocket (not shown), mounted or affixed to a radial bearing, that engages the saw chain and helps reduce friction and resultant wear to the chain and bar as the chain rounds the U of the nose 110. The sprocket, which is subjected to dirt and debris due to its location on the bar and proximity to the cutting area 118, thus requires lubrication to avoid overheating, seizing and/or being subject to excessive wear due to dirt and debris. In the depicted embodiment, each of first oil channel 106 and second oil channel 108 runs along the length of the bar 100, to convey oil directly to or proximate to the nose 110 and the sprocket. Oil (or some other suitable fluid) running through first oil channel 106 exits the channel at first oil (or fluid) exit port 112, and oil running through second oil channel 108 exits the channel at second oil (or fluid) exit port 114. In this configuration, lubricating oil or another suitable fluid is delivered to nose 110 and any sprocket attached thereto, as well as the cutting area 118 of the bar and bar groove, regardless of the orientation of the bar, either in use, or if flipped by an operator to help distribute wear more evenly around the bar.

In some embodiments, where the first oil channel 106 and second oil channel 108 do not interconnect, the powerhead may be configured to deliver two different fluids, one to first oil (or fluid) hole 102, to be carried through the first oil (or fluid) channel 106, and a second, different fluid to second oil (or fluid) hole 104, to be carried through the second oil (or fluid) channel 108. For example, oil may be delivered to the first oil channel 106, which may discharge through first oil exit port 112. First oil exit port 112, as depicted in FIG. 1, may be positioned so that the saw chain carries fluid from the first oil exit port 112 to nose 110, to lubricate an attached sprocket (not shown). A second fluid, such as an abrasive cutting fluid or coolant, may be delivered to the second fluid channel 108, which may discharge through second fluid exit port 114. Second fluid exit port 114, as depicted in FIG. 1, may be positioned so that the saw chain carries fluid from the exit port 114 to the cutting area 118, where the fluid may enhance cutting and/or cool the cutting area 118 to extend bar and chain longevity. In some embodiments, the oil from first oil exit port 112 may be compatible with the fluid from the second fluid exit port 114, so that the cutting area 118 both is lubricated and cooled. In other embodiments, the different fluids may both be lubricants, with one type of lubricant engineered to minimize wear and maximize functionality of the rotating sprocket, and another type of lubricant engineered to cool and minimize wear of the cutting area 118.

Although the first and second oil or fluid channels 106, 108, in the depicted embodiment are predominantly straight and run the length of the bar roughly or substantially parallel to the bar's longitudinal axis, this should not be taken as limiting. Other embodiments may have more or fewer (e.g. one) channels (s). In some embodiments, each channel may have multiple oil or fluid exit ports along the length of the bar 100, such as to one or more spots in the bar groove 116 to provide lubrication to the saw chain. For example, second oil channel 108 may include one or more additional oil exit ports along the bottom length of the bar 100 to supply additional lubrication proximate to the cutting area 118. In other examples, both the first oil channel 106 and second oil channel 108 may include additional oil exit ports along the length of bar 100, to accommodate an operator affixing the bar with either long edge oriented down, to present cutting area 118 on either the top or bottom edge. In such embodiments, the oil exit ports may include a gravity-based valve mechanism so that only the edge oriented as the bottom, with the cutting area 118, is fed additional oil.

The oil or fluid exit ports may be positioned so that oil is delivered near the sliding interface, e.g. where the saw chain contacts the top of the bar groove 116, which form rails. Delivery of oil to the base of the bar groove 116, rather than the side walls and more proximate to the sliding interface, further helps avoid potential clogging by debris that may become lodged in and/or accumulate at the bottom of the bar groove. As the saw chain travels around the bar perimeter, it more readily cleans the side walls of the bar groove 116, but may not extend to dear the bottom of the bar groove 116. Thus, positioning the oil exit ports proximate to the bar groove 116 side walls helps ensure consistent oil delivery that is not obstructed by debris. Moreover, delivery of oil proximate to the sliding interface at the edge of the bar 100 helps ensure the majority of the delivered oil reaches the sliding interface and rivet joints on the saw chain, while delivery of oil at the bottom of the bar groove may require increased lubrication delivery as the bar groove 116 needs to be filled before the oil reaches the sliding interface and saw chain.

Figure 2:
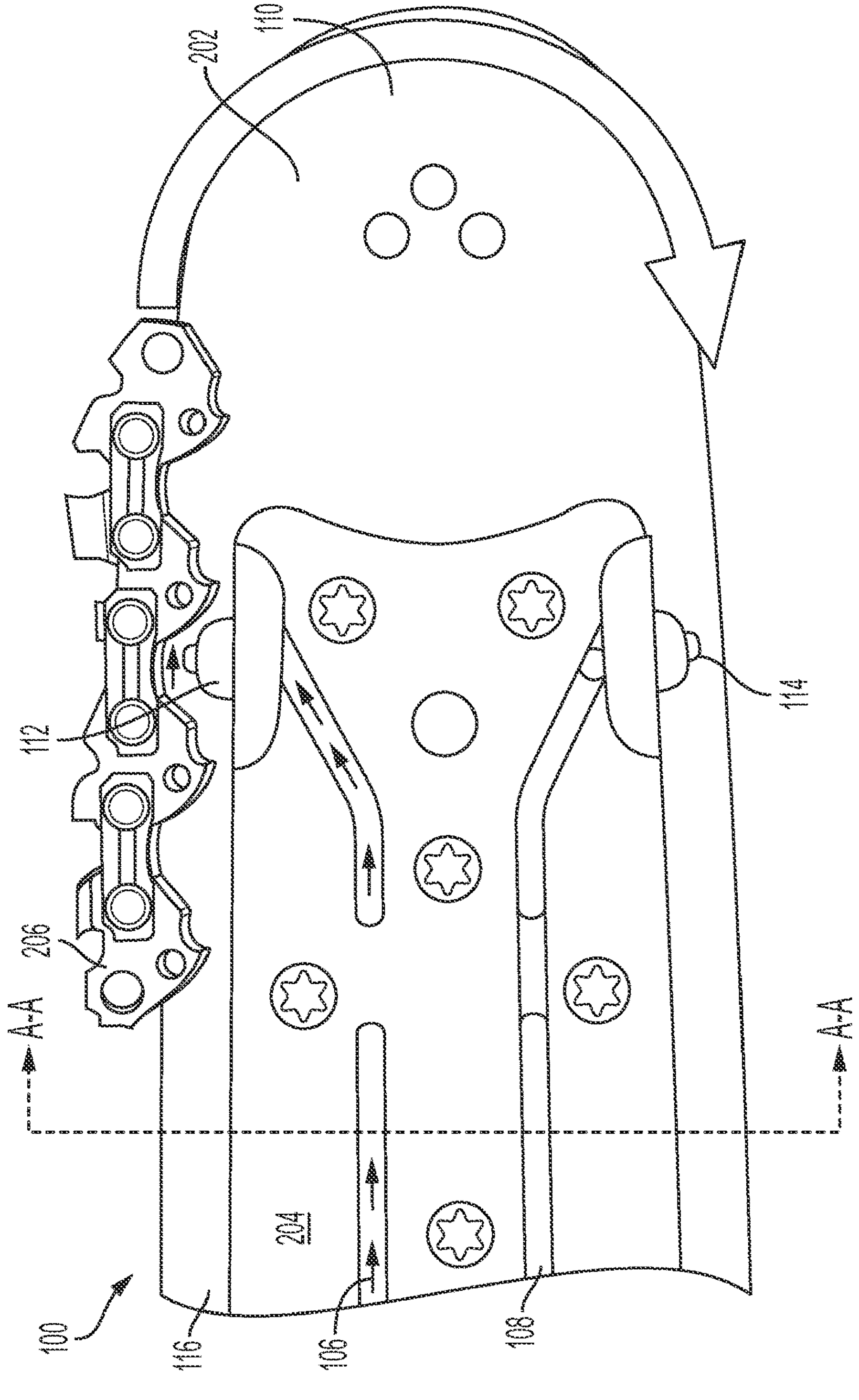
FIG. 2 is a close-up cross-section view of the example chain saw bar of FIG. 1, illustrating the internal bar structure and oil channels for delivering oil to the nose sprocket, according to various embodiments.
Figure 4E:
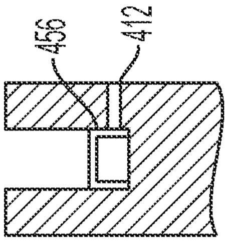
FIGS. 4A-4E are a series of perspective and cross-sectional views of alternative arrangements of oil channels for a solid bar, according to various embodiments.
Figure 4D:
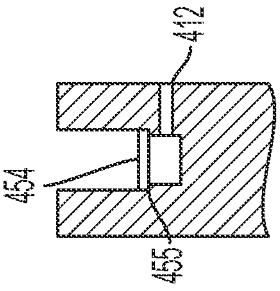
Figure 4B:
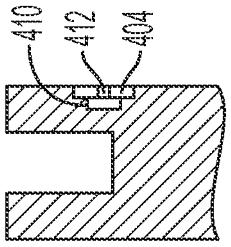
Figure 4A:
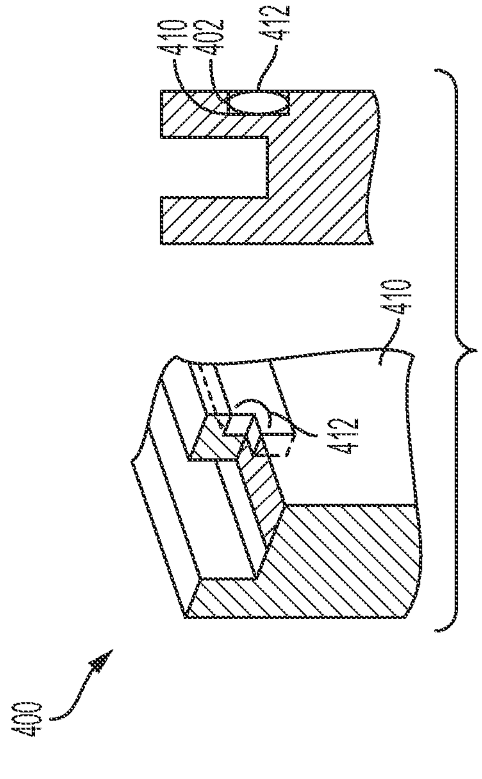
Figure 4C:
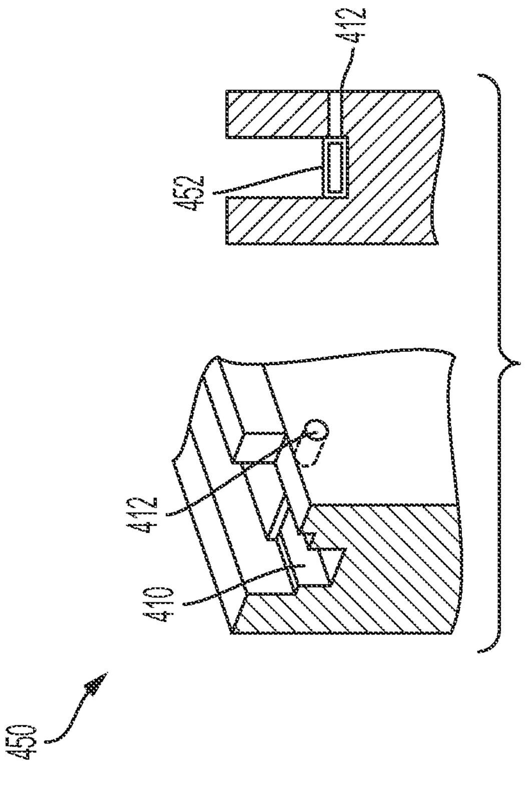

FIG. 2 is a close-up of nose 110 of example bar 100, which illustrates the construction of the bar 100. Bar 100, in the depicted embodiment, is manufactured as a laminate with at least three layers. Two outer layers 202, defining a first side 202*a* and a second side 202*b*, are welded, bonded, riveted, fastened, or otherwise suitably attached to either side of an inner core 204. The sides of the inner core 204 define a perimeter edge 208, which forms a bottom of the bar groove 116, in embodiments. As FIG. 2 is a cut-away, only one of the outer layers 202 is illustrated; a second outer layer 202 would overlay the inner core 204, to create a sandwich. In the depicted embodiment, the first and second channels 106 and 108 are formed into the inner core 204, which is sealed by the attachment of the outer layers 202. Further, saw chain 206 is depicted, with a portion of the saw chain 206 extending into bar groove 116. The portion of the saw chain 206 that extends into bar groove 116 may be configured to pick up any lubrication present within the bar groove 116 and carry it down the groove, to help evenly distribute lubrication. In embodiments where there are oil exit ports located along the sidewall(s) of bar groove 116, the interaction of the portions of saw chain 206 that are within the bar groove 116 can pick up oil from the oil exit ports and convey it towards the rails atop the bar groove 116.

Depending upon the orientation of the oil exit ports 112 and 114, the oil may be picked up by the rotating sprocket in the nose 110 and distributed across the rotating sprocket by rotation of the sprocket. In some embodiments, the sprocket itself may include features or channels to help direct the flow of oil exiting the oil exit ports 112/114 to high-friction areas in the nose 110, including the bar rails and any sprocket bearing surface. As illustrated by the arrow, the saw chain 206 moves across the top of the bar away from the power head (not shown, to the left of FIG. 2), around the nose 110, and back towards the cutting area 118 (shown in FIG. 1). Similarly, the set of smaller arrows starting in first channel 106 illustrates the flow of lubricating oil along the first channel 106 and out through first oil exit port 112. In such a configuration, first oil exit port 112 emits oil just prior to nose 110. Saw chain 206 can pick up such oil and help distribute it around a sprocket installed into nose 110. Second oil exit port 114 can emit oil just prior to cutting area 118, helping to supply adequate lubrication to bar groove 116 along cutting area 118, and in particular to the rails at the top of the bar groove 116 that interface with saw chain 206. It will be understood that the flow of oil to second oil exit port 114 from second channel 108 is substantially identical to the flow of oil depicted for first channel 106. In some embodiments, particularly when the scale of components is relatively large (e.g., a commercial harvester) and oil quantities can present a significant weight, the oil exit ports may be configured so that oil is delivered roughly along the center of gravity of the chain, to help maintain balance of the saw/cutting assembly.

Figure 9:
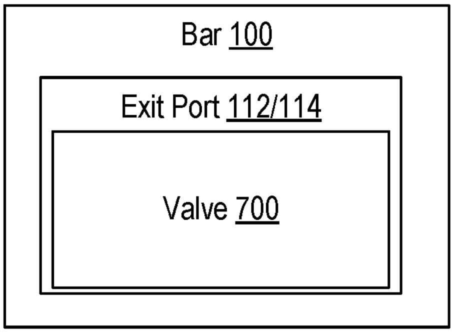
FIG. 9 is a diagram of an exit port having a valve, according to various embodiments.

In cutting area 118 (FIG. 1), as will be appreciated by a person skilled in the art, the rails and saw chain 206 are subject to relatively high pressures when the saw is cutting, as the saw chain 206 is pressed between the work piece and the rails of the bar groove 116. This typically increases the temperature of the bar 100 in cutting area 118 due to increased friction, making adequate lubrication in cutting area 118 critical. In particular, as the temperature of bar 100 in cutting area 118 rises, increasing lubrication is needed to avoid increased wear to the bar 100 and/or saw chain 206. In some embodiments, one or more of the oil exit ports, including oil exit ports 112 and 114, may be equipped with a valve mechanism to control the flow of oil from the exit port (e.g., valve 700 as shown in FIG. 9). In other embodiments, the valve mechanisms may be disposed along first and/or second oil channels 106, 108 away or remote from corresponding oil exit ports 112 and 114, such as closer to the oil delivery hole 102/104. In some embodiments, the valves may include a selectable function or distribution valve, where the flow of oil to various points can be selectively closed, opened, or modulated.

The valve mechanisms may be temperature sensitive so as to open in proportion to local bar temperature. In some embodiments, the temperature sensitive areas are proximate to the oil exit ports 112/114. In other embodiments, temperature sensitive areas may be located distal from the oil exit ports 112, 114, such as where it is calculated that oil will be transported and deposited due to action of the saw chain 206. In such embodiments, locating the valve mechanisms remote from the oil exit ports 112, 114 along oil channels 106, 108, may allow the valves to respond more accurately to temperature changes. Thus, as various areas proximate to each oil exit port or valve location increase, the valve in each area will open more, allowing more oil to flow to areas with elevated temperatures. For example, as the saw is used, cutting area 118 increases in temperature. As oil exit aperture 114 is proximate to cutting area 118, it will be subject to temperature increases along bar 100 at cutting area 118. Thus, a valve positioned at oil exit aperture 114 will allow increased oil flow as cutting area 118 heats up. Further still, it should be recognized that bar 100 may be inverted, and the placement of oil exit apertures 112 and 114 will nevertheless still function correctly in either orientation, in particular when equipped with thermally sensitive valves.

As an alternative, thermally sensitive valves may operate in a reverse fashion from the foregoing, such as where the viscosity of the bar oil decreases as bar temperature increases. In such embodiments, the thermally sensitive valves may be fully open or nearly fully open when the bar is cold, to ensure a sufficient quantity of viscous oil is delivered to the bar. As the bar heats up, the oil is likewise heated as it travels through the bar and so thins, decreasing its resistance and increasing its flow rate. The thermally sensitive valves then accordingly close down to slow the flow rate of the thinned heated oil, to prevent too much of the thinner heated oil from flowing out.

Still further, the valve or valve mechanism may provide a combination of functionality, e.g. combining both thermal sensitivity with gravity actuation (discussed above), Such functionality may be obtained in a single valve mechanism, or with a combination of valves. Such a valve or combination of valves may limit oil flow based on temperature as well as close off oil supply when the bar is in a position that would otherwise allow the oil (or other fluid) to drain out of the bar. In other embodiments, the valve mechanism may include an actuation mechanism that can be directly actuated by a signal, such as from the saw powerhead.

Equipping a valve to each oil exit aperture can further prevent oil from leaking out of the bar 100 while the chain saw is not in use, as each valve can substantially or entirely shut as the bar 100 cools and approaches ambient temperature. In some embodiments, the valves may be configured to have a nominal or base flow, to ensure that the saw chain 206 and bar 100 receive initial lubrication when cold, such as where it is determined that residual lubrication may be insufficient to prevent excessive wear when the saw is initially started. Flow rates may then increase as the saw chain 206 and bar 100 ramp up to operating temperatures. In some embodiments, in addition to or in the alternative to a valve, each oil exit aperture 112 and 114 may be fitted with a screen or similar plug that allows oil to exit, but prevents debris from entering into the channel and causing a plug or dog. The positioning of a screen or plug can allow debris to be pushed away by flowing oil before entering into the corresponding oil channel, where it may otherwise become lodged and interfere with delivery of sufficient oil. Still further, the degree to which each valve can open and/or the speed at which each valve opens in response to increasing temperatures can allow oil consumption of the chain saw to be tailored, possibly at the expense of increased component wear. Thus, oil consumption can be minimized at the expense of possibly increased component wear (better for the environment), component wear can be minimized at the expense of increased oil consumption (better for expensive parts longevity and possibly minimizing saw downtime for replacing components), or the cost of wasted oil can be optimized relative to the cost of replacement parts, thereby minimizing overall costs (oil costs+replacement parts costs).

Figure 3:
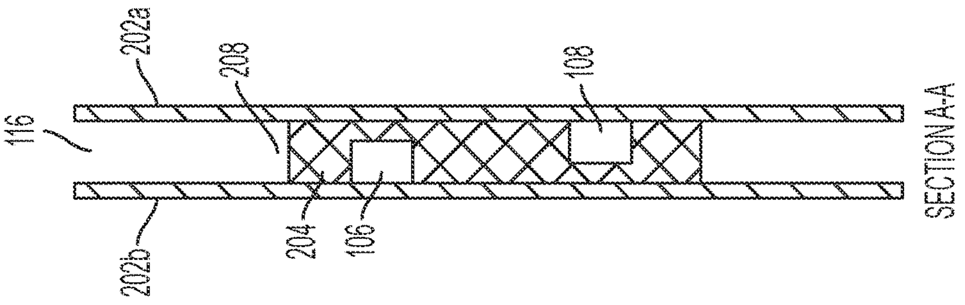
FIG. 3 is a cross-sectional view of the example chain bar of FIGS. 1 and 2, illustrating the laminated layers of the bar, according to various embodiments.

FIG. 3, a cross-section A-A of FIG. 2, illustrates the arrangement of the lamination of bar 100 according to a possible embodiment, with first outer layer 202*a* and second outer layer 202*b* sandwiching the inner core 204. The three layers can be secured by any suitable technique that allows the three layers to be attached sufficiently to handle any internal pressure imposed by pumping oil into the first and second channels 106 and 108 as well as the expected operating conditions of the bar. Some welding or bonding techniques, such as spot welding, may be more appropriate where the oil is pumped into the bar at a relatively low pressure. Spot welding may be unsuitable where the oil pressure, possibly in combination with increased operating temperatures, may cause the oil to escape from the channels 106 and 108 between weld spots and bleed into the surrounding bar groove 116. Other techniques may be employed to create a laminated structure that can withstand greater pressures, such as laser welding, ion beam welding, continuous resistance welding, brazing, soldering, mechanical fasteners such as rivets or screws, adhesives, and/or a combination of any of the foregoing, etc. Still other techniques may be utilized, such as adhesive bonding, for example, using epoxy.

As can be seen in FIGS. 1-3, oil channels 106 and 108 are formed into inner core 204. The oil channels 106 and 108 may be machined into the inner core prior to lamination, and may penetrate fully or partially through the inner core. In some embodiments, such as where one or more of the oil channels penetrates completely through inner core 204, inner core 204 may be implemented as multiple pieces, with the one or more oil channels formed by spacing of the core pieces relative to each other. In still other embodiments, some portion or all of an oil channel or channels may be formed into one or both outer layers 202*a*, 202*b*. The placement of a portion or all of an oil channel on either an outer layer 202 or inner core 204 may be determined based upon the thickness of the materials as well as the needs of a given implementation. A laminated method of construction allows relatively easy formation of passages, as it allows for ready machining of open passageways that are subsequently sealed in the lamination process. In other embodiments, bar 100 may be implemented as a single, solid piece, with the passages formed through the bar using any suitable technique. For example, a channel could be placed on an outboard face of the bar 100, via milling. Further, a deeper groove from the channel could be machined, and connected to the channel via a tube or cap. Examples of these sorts of embodiments using a solid piece bar will be described herein with respect to FIG. 4.

FIGS. 4A-4E illustrates several possible embodiments, corresponding to embodiments A through E, respectively, of a solid bar 400 with a face channel, and solid bar 450 with a groove channel, with various ways in which an oil channel 410 can be milled into the bar. As may be seen, embodiments A and B, which implement a channel formed or milled into the face per bar 400, use a channel that is milled into the exterior of the bar 400 with either a tube 402, in embodiment A, placed into the groove, or a cap 404, in embodiment B, place over the groove. Bar 400 has a channel milled into its exterior surface, opposite to the bar groove. In embodiment A, a tube 402 configured to the shape of the milled channel 410 is inserted into the channel 410. The tube 402 includes an oil inlet 412, through which oil passes through the tube 402 for delivery at distal locations along the bar 400. In embodiment A, oil travels through tube 402, rather than in the entirety of channel 410. In embodiment B, the channel 410 is milled with a step to form a deeper, narrower channel portion and a shallower, wider channel portion. A cap 404 is then placed into the shallower, wider channel portion, thereby enclosing the narrower, deeper channel, so that channel 410 directly conducts oil. The cap 404 includes an inlet port 412 to allow oil to flow into the deeper channel 410.

Alternatively, channel 410 may be milled within the bar groove, as seen in bar 450 in embodiments C, D, and E. In embodiment C, a tube 452 is placed into the bottom of the channel 410, with an inlet port 412 connecting the tube 452 to the exterior of the bar 450, allowing oil to be conveyed to the tube 452. In embodiment D, a step 455 is milled into the sides of the groove 410 to accommodate a cap 454. The cap 454 encloses the bottom of the groove 410, with the inlet port 412 conveying oil to the groove, which flows beneath the cap until reaching an exit port. In embodiment E, a block 456 is inserted into the bottom of the groove 410, effectively forming two narrow channels. Oil from the inlet port 412 can flow into one channel, over the top of the block 456, and into the channel on the opposing side of the block. Embodiment E, for example, may be useful when it is intended that the saw chain help transport oil down the length of the groove.

Figure 5A:
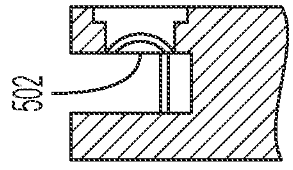
Figure 5B:
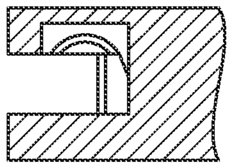
Figure 5C:
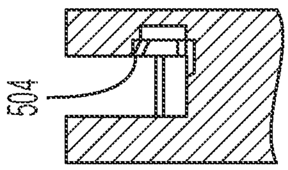
Figure 5D:
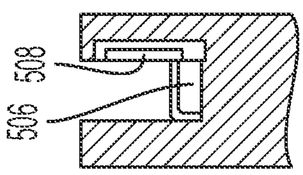
Figure 5E:
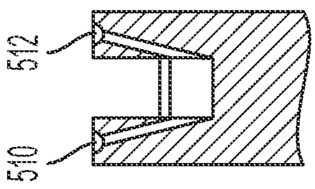
Figure 5F:
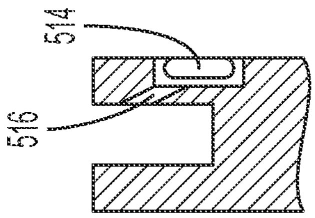
Figure 5G:
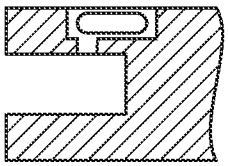
Figures 1, 5H:
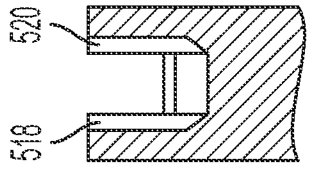
Figures 2, 5H:
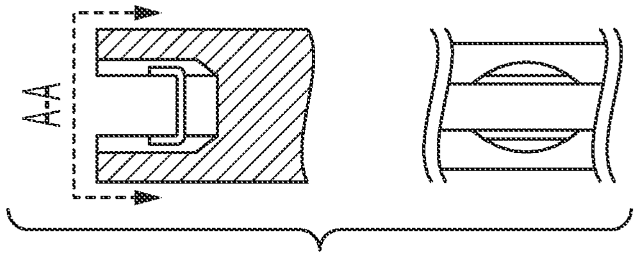

FIGS. 5A-5H2, corresponding to embodiments A through H (embodiment H having a cross section view depicted in 5H1 and 5H2), illustrate cross-sections of a variety of different exit port embodiments for solid bars. In embodiment A, an outside channel with an insert 502 uses a curved port to deliver oil flowing through the channel to the side of the bar groove. Embodiment B shows a similar configuration, but with the channel milled inside the groove. Embodiment C shows an exit port where a cap encloses the bottom of the groove, and oil flows from the enclosed bottom groove through a side inboard insert 504 to deposit oil on the sidewall of the bar groove. In embodiment D, a block 506 is installed into the bottom of the groove, and a shim 508 is inset into the inner sidewall of the groove, to convey oil from the side and top of the block to the top of the groove sidewall. In embodiment E, a cap is placed into the groove, and two outlet ports 510, 512 carry oil from the capped grove to the top of the bar groove, i.e. the rails upon which the chain slides. In embodiment F, a bar with an outside groove includes a tube 514, with an outlet port 516 angled from the tube to near the inside top of the groove. In embodiment G, a tube is installed into the outside groove similar to embodiment F, but the outlet port extends straight, exiting the side of the groove approximately halfway between the top rails and the bottom of the groove. Finally, embodiment H is a capped groove, with semi-circular cutouts 518, 520 that extend from the oil channel below the cap to the top rails, with a portion of the rails removed to form the cutout. The cutout thus conveys oil up to both the sidewalls of the groove as well as the top rails. In a variation, the cap may be formed as a U-shaped channel to allow the semi-circular cutout to convey a greater quantity of oil to the top rails.

Figure 6A:
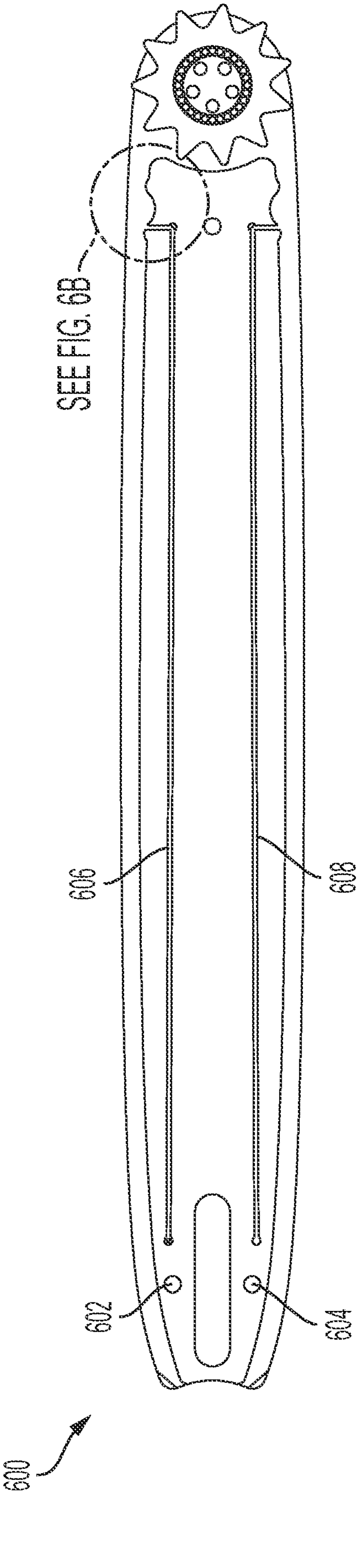
FIG. 6A is a cross-section of a second example chain saw bar, illustrating another possible arrangement of oil channels for targeted oil delivery, according to various embodiments.
Figure 6B:
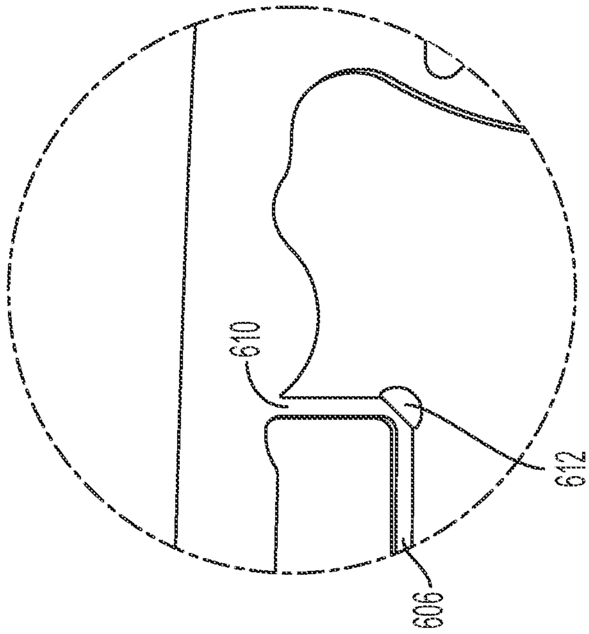
FIG. 6B is a dose up of the inset from FIG. 6A, illustrating details of the arrangement of oil channels for targeted oil delivery, according to various embodiments.

FIGS. 6A and 6B depict another embodiment of a bar 600 configured for targeted oil delivery. Bar 600 includes first oil hole 602 and second oil hole 604, which in turn feed oil channels 606 and 608 that run along the bar 600, roughly or substantially parallel to the bar 600's longitudinal axis. These structures are similar to those recited in FIG. 1 with respect to bar 100; the reader is directed to the corresponding description of FIG. 1 above for further details. Bar 600 differers from bar 100 in the terminus of each oil channel 606 and 608, illustrated in FIG. 6B, the inset from FIG. 6A. As seen in FIG. 6B, oil channel 606 turns roughly 90 degrees orthogonal from the longitudinal axis of the bar 600 to form a roughly perpendicular channel 610, which feeds oil to the chain and chain groove prior just prior to the nose sprocket.

At the corner where oil channel 606 turns to channel 610, a plug 612 may be included that can be removed for clean-out purposes, in the event that channel 610 and/or channel 606 become fouled with debris. Plug 612, in embodiments, may be constructed from an elastomeric compound to allow both relative ease of removal as well as a modicum of buffering pressure against oil that is pressurized down channel 606. It should be understood that oil channel 608 may terminate with a similar perpendicular channel and be similarly equipped with an elastomeric plug, in a substantially mirrored configuration to channels 606 and 608, and plug 612.

Figure 7B:
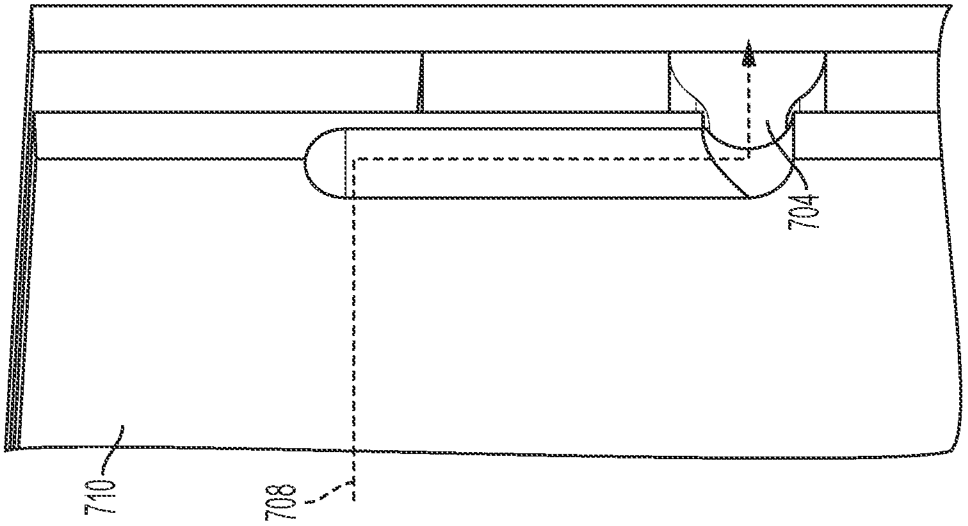
FIG. 7B is a perspective view of the example elongated oil port of FIG. 7A, illustrating the path of the oil flow into the port to the central channel, according to various embodiments.
Figure 7A:
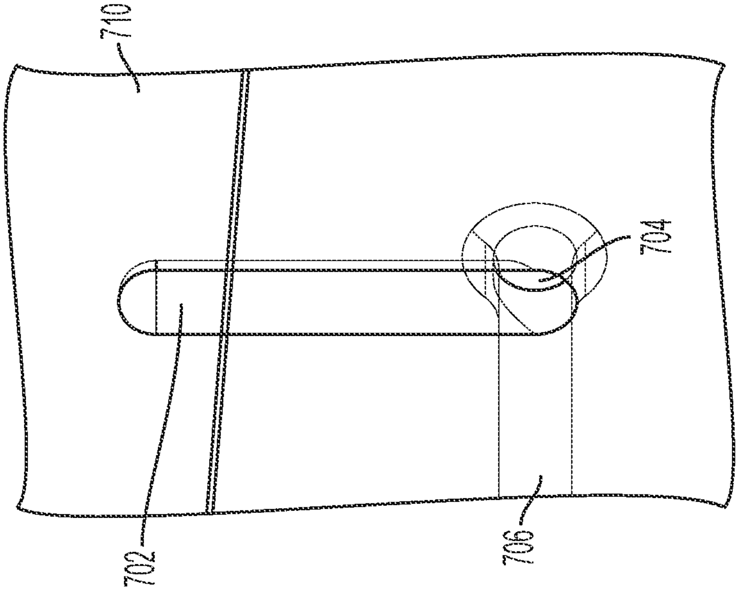
FIG. 7A is a close up perspective view of an example elongated oil port to direct oil flow from a power head oiler to a central channel in a saw bar, according to various embodiments.

FIGS. 7A and 7B illustrate a variation embodiment on the oil holes 102, 104 of FIG. 1, and oil holes 602, 602, of FIG. 6A. In FIG. 7A, an elongated oil hole 702 is formed as a channel on an exterior surface 710 of the bar, such as by miffing, machining, or otherwise forming the elongation on or in an outer wall that is attached to an inner or central core. In some embodiments, the elongated oil hole may be formed by creating a slot or channel through an outer wall to expose the inner core, with a side surface of the inner core thus creating the bottom of the elongated oil hole. The elongated oil hole acts as a channel to conduct oil down to an oil hole or via 704, that conducts the oil into oil channel 706, which may flow through a central or inner core, similar to the oil channels discussed above with respect to FIG. 1. The flow of oil through the elongated oil hole 702 is illustrated in FIG. 7B by dashed line 708. By equipping a bar with an elongated oil hole 702, flexibility is provided in mounting the bar to different power heads that may have oil outlets in slightly different locations that may not precisely line up with a circular oil hole, such as oil holes 102, 104, 602, or 604. So long at the length of the elongated oil hole 702 is covered or sealed along its length, oil can be introduced at any point along the elongated oil hole 702, and when pressurized will conduct oil into the via 704 and then into the oil channel 706.

Figure 8:
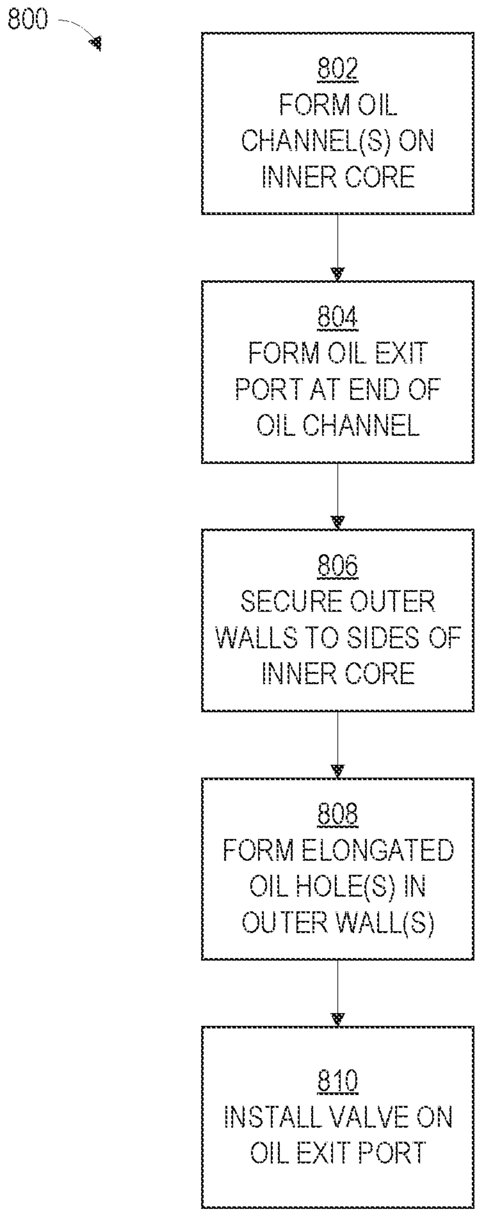
FIG. 8 is flowchart of operations of a method of producing a chain saw bar with targeted oil delivery, according to various embodiments.

FIG. 8 depicts the operations of an example method 800 for producing a chain saw bar with targeted oil (or other fluid) delivery, according to various embodiments, such as bar 100 or bar 600. The operations of method 800 may be performed in the displayed order or out of order, according to the specifics and requirements of a given implementation. Furthermore, operations may be omitted, added, or modified depending on the requirements of a given implementation.

In operation 802, one or more oil channels, such as oil channels 106 and 108, are formed on an inner core, such as inner core 204. The oil channels may be formed using any suitable technique, such as machining or milling using mechanical, electrical, laser, chemical, or another suitable method, or may be formed as part of fabricating the inner core, e.g. as part of casting or forging the inner core. In some embodiments, the core may be manufactured in two or more parts, and spaced apart from each other when secure to the outer walls to form oil channels. In still other embodiments, the channels may be at least partially formed in one or both of the outer walls. For a given oil channel, portions may be located entirely within the inner core, one of the outer walls, or a combination of the walls and inner core. As shown in the embodiments of FIG. 1 and FIGS. 6A and 6B, the oil channels generally run from one end of the chain saw bar that mounts to a power head to another position distal on the chain saw bar, closer to its sprocket end, so that oil is carried from the power head down substantially the length of the chain saw bar.

In operation 804, an oil exit port is formed at the end of each oil channel, proximate to the sprocket end. The oil exit port may be positioned as depicted in one of the various embodiments described above. In embodiments, one oil exit port may be positioned proximate to the sprocket nose of the chain saw bar, positioned where the saw chain can pick up oil just prior to traveling around the sprocket nose, so that the sprocket is adequately lubricated. In embodiments, another exit port may be positioned proximate to the sprocket nose just after the chain travel, so that adequate lubrication is applied and carried across the cutting area of the bar, the area that typically receives the most wear and friction when the saw is applied to a work piece.

In operation 806, the outer walls are secured to the sides of the inner core by a suitable mechanism, as described above. The outer walls are typically sized larger than the inner core, so that when attached to the inner core they extend beyond the edge of the inner core to form the saw chain groove that runs around the perimeter of the bar, and into which at least a portion of the saw chain typically runs. The inner core, in embodiments, also stops short of the outer walls at the nose to form a cavity within which the nose sprocket rotates. Depending on the configuration of the power head, saw chain and bar, portions of the bar, such as opposite the nose where the bar engages to the power head, may have the inner core sit flush with the outer walls where the saw chain doesn't run in the chain groove, e.g. the chain leaves the groove to engage with the drive mechanism within the power head. The outer walls may also have various apertures machined in them to provide any necessary attachment points for the bar into the power head. Further, one or both outer walls may have an aperture or hole formed that communicates with the oil channels, so that oil from the power head can be transported into the oil channels within the bar.

In operation 808, the apertures or holes that are formed into the outer walls may be elongated to accommodate different configurations of power heads that may vary in where they provide oil to the bar. By forming the oil holes into elongated troughs or grooves, such as seen in FIGS. 7A and 7B above, a single model of bar may be made compatible with a number of different power heads.

Finally, in operation 810, one or more of the oil exit ports may be fitted with a valve, as discussed above. The valves may be gravity sensitive, to prevent oil from flowing out of exit ports that are faced down, and/or may be thermally sensitive to adjust flow rates based on heat and/or oil viscosity, as discussed above. In still other embodiments, elastomeric plugs may be fitted in operation 810 in addition to or instead of valves, which may be removed to allow for clearing of debris from the oil channels.

Although the disclosed embodiments have focused on chain saws, such as hand-held saws as well as commercial-scale machines, such as harvesters, it should be understood that the targeted oil delivery techniques discussed herein could be applied with equal effect to other machines that also require lubrication delivery to operational/working components, other than saws.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein, Therefore, it is manifestly intended that embodiments be limited only by the claims and the equivalents thereof.

EXAMPLES

The following are non-limiting examples of possible embodiments;

Example 1 is a bar for a chain saw, comprising an inner core defining a longitudinal axis, the inner core comprising a first side, a second side, and a perimeter edge separating the first side and the second side; a first outer wall disposed on the first side; a second outer wall disposed on a second side of the inner core, the second side opposite the first side; and a fluid channel formed along the longitudinal axis, the channel in fluid communication with a fluid hole at a first end of the channel and a fluid exit port formed at a second end of the channel distal from the first end, wherein the first outer wall and second outer wall extend beyond the perimeter edge of the inner core to form a bar groove, and the fluid exit port is disposed proximate to a cutting area of the bar groove.

Example 2 includes the subject matter of example 1, or some other example herein, wherein the fluid exit port comprises a thermally-sensitive valve.

Example 3 includes the subject matter of example 1 or 2, or some other example herein, wherein the first outer wall and second outer wall are each secured to the inner core by laser welding, spot welding, ion beam welding, or continuous resistance welding.

Example 4 includes the subject matter of any of examples 1-3, or some other example herein, wherein the fluid channel is a first fluid channel, the fluid hole is a first fluid hole, and the fluid exit port is a first fluid exit port, and further comprising a second fluid channel formed along the longitudinal axis, the second fluid channel in fluid communication with a second fluid hole at a first end of the second fluid channel and a second fluid exit port formed at a second end of the second fluid channel, and wherein the second fluid exit port is disposed proximate to a nose of the bar, the nose of the bar configured to accept a sprocket wheel.

Example 5 includes the subject matter of example 4, or some other example herein, wherein the first fluid exit port and the second fluid exit port comprise thermally-sensitive valves.

Example 6 includes the subject matter of any of examples 1-5, or some other example herein, wherein the fluid hole is elongated and formed at least partially into one of the first or second outer walls.

Example 7 includes the subject matter of any of examples 1-6, or some other example herein, wherein the fluid channel further comprises a removable elastomeric plug.

Example 8 includes the subject matter of any of examples 1-7, or some other example herein, wherein the fluid exit port is disposed on one of the first or second outer walls.

Example 9 includes the subject matter of any of examples 1-8, or some example herein, wherein the fluid exit port is disposed on the perimeter edge of the inner core.

Example 10 includes the subject matter of any of examples 1-9, or some other example herein, wherein the fluid channel is formed within the inner core.

Example 11 includes the subject matter of any of examples 1-10, or some other example herein, wherein the fluid channel is formed at least partially within the bar groove between the perimeter edge and a cap that is spaced away from the perimeter edge and spans within the bar groove between the first and second outer wads.

Example 12 includes the subject matter of any of examples 1-11, or some other example herein, wherein the fluid channel is formed at least partially within the bar groove with a tube that is disposed upon the perimeter edge.

Example 13 is a chainsaw, comprising a power head that comprises an oiling mechanism; a chain saw bar coupled to the power head at a first end such that it receives oil from the oiling mechanism; and a saw chain disposed around a perimeter groove of the chain saw bar and coupled to the power head so that it receives rotational motion from the power head, wherein the chain saw bar comprises first and second outer walls, each disposed on a side of an inner core and extending past a perimeter edge of the inner core, the perimeter groove defined by the first and second outer walls and perimeter edge, a plurality of oil channels disposed within the inner core, each of the plurality of oil channels having a first end configured to receive oil from the oiling mechanism, and a second end terminating in an oil exit port located distal from the chain saw bar first end, and a second end that houses a sprocket that engages with the saw chain, and wherein at least one of the oil exit ports of one of the plurality of oil channels is located at the chain saw bar second end proximate to the sprocket.

Example 14 includes the subject matter of example 13, or some other example herein, wherein the chain saw bar comprises a section located between the first end and second end that is a working section, and wherein a second one of the oil exit ports of one of the plurality of oil channels is located in the working section.

Example 15 includes the subject matter of example 13 or 14, or some other example herein, wherein each of the oil exit ports comprises a valve mechanism.

Example 16 includes the subject matter of any of examples 13-15, or some other example herein, wherein the valve mechanism is thermally sensitive.

Example 17 includes the subject matter of any of examples 13-16, or some other example herein, wherein the valve mechanism is gravity actuated.

Example 18 is a method for creating a chain saw bar, comprising forming, in an inner core with a perimeter edge defined between a first side of the inner core and a second side of the inner core, a fluid channel that extends between a first end of the inner core and a second end of the inner core, the first end configured to receive a fluid from a fluid supply; forming, at the second end of the inner core, a fluid exit port; securing, to the first side of the inner core, a first outer wall; and securing, to the second side of the inner core, a second outer wall, wherein the first outer wall and second outer wall extend past the perimeter edge to define a saw chain groove, and the fluid exit port is in communication with the saw chain groove.

Example 19 includes the subject matter of example 18, or some other example herein, further comprising forming, at the first end of the inner core, an elongated fluid hole in one of the first outer wall or second outer wall, the elongated fluid hole in fluid communication with fluid channel.

Example 20 includes the subject matter of example 18 or 19, or some other example herein, further comprising disposing, within the fluid channel, a removable elastomeric plug.

What is claimed is:

1. A bar for a chain saw, comprising:

an inner core defining a longitudinal axis, the inner core comprising a first side, a second side, and a perimeter edge separating the first side and the second side;

a first outer wall disposed on the first side;

a second outer wall disposed on a second side of the inner core, the second side opposite the first side; and a first fluid channel formed along the longitudinal axis, the first fluid channel in fluid communication with a first fluid hole at a first end of the channel and a first fluid exit port formed at a second end of the channel distal from the first end; and a second fluid channel formed along the longitudinal axis, the second fluid channel in fluid communication with a second fluid hole at a first end of the second fluid channel and a second fluid exit port formed at a second end of the second fluid channel wherein:

the first outer wall and second outer wall extend beyond the perimeter edge of the inner core to form a bar groove;

the first fluid exit port is disposed at or near the perimeter edge and proximate to a cutting area of the bar groove;

the first fluid exit port comprises a valve; and the second fluid exit port is disposed proximate to a nose of the bar.

2. The bar of claim 1, wherein the valve is thermally-sensitive such that the valve is configured to open as temperature of the valve increases and close as the temperature of the valve decreases.

3. The bar of claim 1, wherein the valve is configured such that gravity actuates the valve such that the valve prevents oil from flowing out of the fluid exit port in response to a spatial orientation of the fluid exit port relative to the gravity.

4. The bar of claim 1, wherein the nose of the bar is configured to accept a sprocket wheel.

5. The bar of claim 4, wherein the second fluid exit port comprises an additional valve configured to allow greater flow of fluid through the second fluid exit port at a first temperature as compared to at a second temperature, the first temperature being greater than the second temperature.

6. The bar of claim 1, wherein the first fluid hole is elongated and formed at least partially into one of the first or second outer walls.

7. The bar of claim 1, wherein the first fluid channel further comprises a removable elastomeric plug positioned at a corner where the fluid channel changes direction.

8. The bar of claim 1, wherein the first fluid exit port is disposed on one of the first or second outer walls.

9. The bar of claim 1, wherein the valve is positioned at the perimeter edge of the inner core.

10. The bar of claim 1, wherein the first fluid channel is formed within the inner core.

11. The bar of claim 1, wherein the first fluid channel is formed at least partially within the bar groove between the perimeter edge and a cap that is spaced away from the perimeter edge and spans within the bar groove between the first and second outer walls.

12. The bar of claim 1, wherein the first fluid channel is formed at least partially within the bar groove with a tube that is disposed upon the perimeter edge.

13. A chainsaw, comprising:

a power head that comprises an oiling mechanism;

a chain saw bar coupled to the power head at a first end such that it receives oil from the oiling mechanism; and a saw chain disposed around a perimeter groove of the chain saw bar and coupled to the power head so that it receives rotational motion from the power head, wherein the chain saw bar comprises:

first and second outer walls, each disposed on a side of an inner core and extending past a perimeter edge of the inner core, the perimeter groove defined by the first and second outer walls and perimeter edge, a plurality of oil channels disposed within the inner core, each of the plurality of oil channels having a first end configured to receive oil from the oiling mechanism, and a second end terminating in an oil exit port located distal from the chain saw bar first end, and a second end that houses a sprocket that engages with the saw chain, and wherein at least one of the oil exit ports of one of the plurality of oil channels is located at the chain saw bar second end proximate to the sprocket and comprises a valve, wherein the valve is thermally sensitive such that the valve increasingly opens to allow for greater oil flow at a higher temperatures as compared to at a lower temperature.

14. The chainsaw of claim 13, wherein the chain saw bar comprises a section located between the first end and second end that is a working section, and wherein a second one of the oil exit ports of one of the plurality of oil channels is located in the working section.

15. The chainsaw of claim 14, wherein the valve is configured to substantially prevent oil from leaking out of the chain saw bar when the chainsaw is not in use.

16. A chainsaw, comprising:

a power head that comprises an oiling mechanism;

a chain saw bar coupled to the power head at a first end such that it receives oil from the oiling mechanism; and a saw chain disposed around a perimeter groove of the chain saw bar and coupled to the power head so that it receives rotational motion from the power head, wherein the chain saw bar comprises:

first and second outer walls, each disposed on a side of an inner core and extending past a perimeter edge of the inner core, the perimeter groove defined by the first and second outer walls and perimeter edge, a plurality of oil channels disposed within the inner core, each of the plurality of oil channels having a first end configured to receive oil from the oiling mechanism, and a second end terminating in an oil exit port located distal from the chain saw bar first end, and a second end that houses a sprocket that engages with the saw chain, and wherein at least one of the oil exit ports of one of the plurality of oil channels is located at the chain saw bar second end proximate to the sprocket and comprises a valve, wherein the valve is gravity actuated such that the valve substantially prevents oil from flowing out of the at least one of the oil exit ports when the at least one of the oil exit ports is facing downwards and allows the oil to flow out of the at least one of the oil exit ports when the at least one of the oil exit ports is otherwise oriented.

17. A method for creating a chain saw bar, comprising:

forming, in an inner core with a perimeter edge defined between a first side of the inner core and a second side of the inner core, a first fluid channel that extends between a first fluid hole at a first end of the inner core and a first fluid exit port at a second end of the inner core, the first end configured to receive a fluid from a fluid supply;

forming a second fluid channel that extends along a longitudinal direction of the chain saw bar, the second fluid channel in communication with a second fluid hole at the first end of the inner core and a second fluid exit port at the second end of the inner core such that the second fluid exit port is disposed proximate to a nose of the chain saw bar;

forming, at the second end of the inner core, the first fluid exit port;

securing, to the first side of the inner core, a first outer wall;

securing, to the second side of the inner core, a second outer wall, wherein the first outer wall and second outer wall extend past the perimeter edge to define a saw chain groove, and the first fluid exit port and the second fluid exit port are in communication with the saw chain groove; and providing a valve at the first fluid exit port, wherein the first fluid exit port is disposed at or near the perimeter edge and proximate to a cutting area of the bar groove, and wherein the valve is configured to substantially prevent oil from leaking out of the chain saw bar when the chain saw bar is not in use and allow oil to pass out of the fluid exit port when the chain saw bar is in use.

18. The method of claim 17, further comprising forming, at the first end of the inner core, the first fluid hole as an elongated fluid hole in one of the first outer wall or second outer wall, the elongated fluid hole in fluid communication with the first fluid channel.

19. The method of claim 18, further comprising disposing, within the first fluid channel, a removable elastomeric plug.

* * * * *